United States Patent
Ohsumi (10) Patent No.: US 9,344,611 B2
(45) Date of Patent: May 17, 2016

(54) AUTOMOTIVE CAMERA MOUNTING APPARATUS

(71) Applicant: Hitachi Automotive Systems, Ltd., Hitachinaka-shi, Ibaraki (JP)

(72) Inventor: Ken Ohsumi, Hitachinaka (JP)

(73) Assignee: Hitachi Automotive Systems, Ltd., Hitachinaka-shi (JP)

( * ) Notice: Subject to any disclaimer, the term of this patent is extended or adjusted under 35 U.S.C. 154(b) by 0 days.

(21) Appl. No.: 14/352,252

(22) PCT Filed: Oct. 24, 2012

(86) PCT No.: PCT/JP2012/077390
§ 371 (c)(1),
(2) Date: Apr. 16, 2014

(87) PCT Pub. No.: WO2013/080706
PCT Pub. Date: Jun. 6, 2013

(65) Prior Publication Data
US 2014/0247390 A1    Sep. 4, 2014

(30) Foreign Application Priority Data
Nov. 30, 2011    (JP) .................................. 2011-262997

(51) Int. Cl.
| | |
|---|---|
| H04N 5/225 | (2006.01) |
| G06K 9/00 | (2006.01) |
| H04N 13/02 | (2006.01) |
| B60R 11/04 | (2006.01) |
| H04N 7/18 | (2006.01) |
| B60R 1/12 | (2006.01) |
| B60R 11/00 | (2006.01) |

(52) U.S. Cl.
CPC .............. *H04N 5/2253* (2013.01); *B60R 11/04* (2013.01); *G06K 9/00791* (2013.01); *H04N 5/2251* (2013.01); *H04N 5/2252* (2013.01); *H04N 13/0239* (2013.01); *B60R 2001/1253* (2013.01); *B60R 2011/0028* (2013.01); *H04N 7/18* (2013.01)

(58) Field of Classification Search
None
See application file for complete search history.

(56) References Cited

U.S. PATENT DOCUMENTS

| | | | |
|---|---|---|---|
| 5,096,287 A | 3/1992 | Kakinami et al. | |
| 6,811,330 B1 * | 11/2004 | Tozawa | ......................... 396/428 |

(Continued)

FOREIGN PATENT DOCUMENTS

| | | |
|---|---|---|
| JP | 2001-088623 A | 4/2001 |
| JP | 2003-011723 A | 1/2003 |
| JP | 2007-015457 A | 1/2007 |

OTHER PUBLICATIONS

International Search Report on application PCT/JP2012/077390 mailed Jan. 15, 2013; 2 pages.

*Primary Examiner* — Albert Cutler
(74) *Attorney, Agent, or Firm* — Foley & Lardner LLP (57) ABSTRACT

To provide an automotive camera mounting apparatus that has a simplified, lightweight configuration with a minimum increase in weight, is vibration-free during running, and can be steadily mounted on a vehicle body, an automotive camera mounting apparatus 10 for mounting on an inside of a windshield 3 of a vehicle 1 an automotive camera 6 that images a forward view of the vehicle 1 through the windshield 3 includes a taper plate 11 as a support plate disposed along the windshield 3. The taper plate 11 has a first fixing portion 12 on a first end thereof fixed to a front rail 2 disposed on a periphery of the windshield 3 and a second fixing portion 13 on a second end thereof fixed to the windshield 3 via a mirror base 4. The automotive camera 6 is supported by a stay 7 that has a fixing portion 8 fixedly disposed on a third fixing portion 14 formed at an intermediate portion of the taper plate 11.

12 Claims, 8 Drawing Sheets

(56) References Cited

U.S. PATENT DOCUMENTS

| | | | | |
|---|---|---|---|---|
| 7,111,996 B2 * | 9/2006 | Seger | ................ | H04N 13/0239 348/148 |
| 8,077,295 B2 * | 12/2011 | Inagaki | ................ | B60R 11/04 356/3.14 |
| 8,120,645 B2 * | 2/2012 | Katahira | ................ | G03B 35/08 340/436 |
| 8,749,367 B2 * | 6/2014 | Schofield | ................ | B60R 1/1207 340/425.5 |
| 2009/0268013 A1 * | 10/2009 | Katahira et al. | ................ | 348/46 |
| 2009/0295181 A1 * | 12/2009 | Lawlor et al. | ................ | 296/1.11 |
| 2010/0133410 A1 * | 6/2010 | Gruener et al. | ................ | 248/475.1 |
| 2012/0081550 A1 * | 4/2012 | Sewell | ................ | 348/148 |

* cited by examiner

AUTOMOTIVE CAMERA MOUNTING APPARATUS

TECHNICAL FIELD

The present invention relates generally to automotive camera mounting apparatuses and, more particularly, to an apparatus for mounting, for example, a drive recorder and a stereo camera that prevents a collision with a preceding vehicle.

BACKGROUND ART

A known mounting structure as a background art in this technical field includes a pair of left and right cameras, each imaging a road environment forward of a vehicle while the vehicle is running. The cameras are each mounted on either lateral end of a chassis that extends in a lateral direction and has a predetermined length. The chassis includes a mounting seat portion formed at a center thereof. The mounting seat portion of the chassis is fixed to a predetermined mounting position in a vehicle body to thereby mount the pair of cameras on the vehicle body. This results in portions of the chassis other than the mounting seat portion being spaced away from the vehicle body. (See, for example, Patent Document 1.)

An automotive camera apparatus as another background art is mounted on a vehicle and images a traveling environment forward of the vehicle. The automotive camera apparatus includes a base member, an automotive camera, and a rearward check mirror. The base member is attached to an inside of a windshield of the vehicle. The automotive camera is fixed to the base member. The rearward check mirror is fixed to the base member. (See, for example, Patent Document 2.)

PRIOR ART DOCUMENTS

Patent Document

Patent Document 1: JP-2001-88623-A
Patent Document 2: JP-2003-11723-A

SUMMARY OF THE INVENTION

Problem to be Solved by the Invention

To allow an automotive image processing camera to correctly recognize a situation forward of the vehicle, the automotive image processing camera needs to be disposed in parallel with a vehicle axis extending in parallel with a vehicle traveling direction as much as possible. To avoid capturing an inferior image, the automotive image processing camera needs to be disposed such that an angle of view of the automotive image processing camera falls within a wiper wiping area.

Recently, there is a mounting need for techniques of road sign detection and traffic light detection. To detect a road sign, it becomes necessary to recognize one standing at a position a plurality of lanes away, which requires that the angle of view in the lateral direction be widened. To recognize a traffic light at an intersection as a vehicle enters the intersection or waits for a traffic light, the traffic light detection requires that the angle of view be widened upwardly.

The foregoing needs have widened the angle of view of the image processing camera as compared with those in the known cameras. To ensure that the entire widened range of the angle of view falls within the wiper wiping area, the camera needs to be disposed as close as possible to the windshield.

With the type of camera including two imaging parts, one on either lateral end of a stay (hereinafter referred to as a stereo camera), among various types of automotive image processing cameras, relative positional accuracy of the left and right imaging parts needs to be enhanced and the stay becomes heavier in weight to meet the need for increased stiffness. Preferably, the camera is fixed to a front rail portion that permits reliable screw fastening.

Attaching the automotive cameras in the configuration as in Patent Document 1 described above to both ends of the chassis (front rail), however, results in a greater amount of downward protrusion from the fixing points, blocking a field of view from the driver. In late vehicle models, in particular, the angle of inclination of the windshield is made shallow with the aim of improved fuel economy and the windshield has a longer longitudinal length. As a result, the windshield extends to a point close to a head of the driver. Such a shape of the vehicles results in the front rail being disposed at a position closer to the head of the driver than before. Mounting the stereo camera on the front rail poses a problem that makes the driver feel even more obstructed than before.

To satisfy all these mounting requirements without blocking the field of view of the driver, it is optimal to dispose the camera anterior to the front rail. This disposition, however, involves the center of gravity of the camera being considerably anterior to the fixing point of the front rail, so that vibration resistance while the vehicle is traveling is a new problem to be solved. Building a plate or camera housing by incorporating a vibration-resistant structure to compensate for the problem, however, leads to a complicated shape and increased weight.

Meanwhile, as in Patent Document 2, the automotive camera may be affixed to the windshield. It is, however, less reliable to affix a heavy object such as the stereo camera to the windshield. In addition, because of the windshield disposed between the front rail and the camera, unfortunately, mounting accuracy is reduced as compared with the mounting on the front rail.

The present invention has been made in view of the foregoing problems and it is an object of the present invention to provide an automotive camera mounting apparatus that has a simplified, lightweight structural arrangement with a minimum increase in weight, is vibration-free during running, and can be steadily mounted on a vehicle body. It is an object of the present invention to provide an apparatus for mounting the automotive camera particularly suitable for mounting a heavy stereo camera.

Means for Solving the Problem

To achieve the foregoing object, as aspect of the present invention provides an automotive camera mounting apparatus for mounting on an inside of a windshield of a vehicle a camera that images a forward view of the vehicle through the windshield. The automotive camera mounting apparatus comprises a support plate disposed along the windshield, wherein the support plate has a first end portion fixed to a front rail disposed on a periphery of the windshield and a second end portion fixed to the windshield, and the automotive camera is fixedly disposed on a fixing portion formed at an intermediate portion of the support plate.

In the automotive camera mounting apparatus according to the aspect of the present invention having the arrangement as described above, the support plate is disposed along the windshield with the first end portion thereof fixed to the front rail disposed on the periphery of the windshield and the second end portion thereof fixed to the windshield. The support plate, having both end portions in a longitudinal direction fixed in place, is steadily fixed in place. Additionally, because of the automotive camera fixed at the intermediate portion of the support plate, vibration can be controlled and the structural arrangement is simple and lightweight.

Effects of the Invention

The automotive camera mounting apparatus according to the aspect of the present invention is simple and lightweight in structural arrangement, disposed at an optimum position at which the angle of view of the automotive camera falls within the wiper wiping area, and mounted to offer high vibration resistance. The automotive camera, being disposed at an optimum position, makes a viewer viewing the camera from a vehicle interior feel less obstructed.

MODES FOR CARRYING OUT THE INVENTION

Embodiments

<First Embodiment>

The following describes in detail apparatuses for mounting automotive cameras according to embodiments of the present invention with reference to the accompanying drawings. FIGS. 1(a) and 1(b) illustrate an automotive camera mounting apparatus according to a first embodiment of the present invention, FIG. 1(a) being a perspective view showing an area around a position at which an inside rearview mirror is mounted at a front portion of a vehicle as viewed from a forward direction outside a vehicle interior and FIG. 1(b) being a perspective view of the area shown in FIG. 1(a) as viewed from a rearward direction inside the vehicle interior. FIGS. 2(a) and 2(b) illustrate a taper plate incorporated in the apparatus shown in FIGS. 1(a) and 1(b), FIG. 2(a) being a perspective view showing the taper plate as viewed from above and FIG. 2(b) being a perspective view showing the taper plate as viewed from below.

The automotive camera mounting apparatus according to the first embodiment of the present invention will be described in detail below with reference to FIGS. 1(a), 1(b), 2(a), and 2(b). An arrangement for a portion of the vehicle near a windshield at which the automotive camera mounting apparatus according to the first embodiment will first be described. This vehicle 1 includes a front rail 2 as a member that forms part of a vehicle body and extends in a vehicle width direction. The front rail 2 extends in a direction orthogonal to a longitudinal axis of the vehicle body. Formed of a metal plate having a closed section, the front rail 2 is disposed posterior to and above a windshield. The windshield 3 is disposed anterior to the front rail 2 and fixed in a waterproof condition in an opening at a front part of the vehicle body with a waterproof member not shown interposed therebetween. A mirror base 4 is fixed to the windshield 3 through, for example, bonding. An inside rearview mirror 5 for viewing a view of the area behind the vehicle is mounted on the mirror base 4.

The automotive camera mounting apparatus 10 according to the first embodiment allows a camera 6 that images a forward view of the vehicle through the windshield 3 of the vehicle to be attached to an inside of the windshield 3. The automotive camera of this embodiment is a stereo camera 6 comprising a pair of right and left camera portions 6a, 6b. The two camera portions 6a, 6b are fixed to respective lateral ends of a stay 7 having a predetermined length extending in a direction of the front rail 2, specifically, the vehicle width direction. The stay 7 has a fixing portion 8 formed at a central position thereof. The fixing portion 8 assumes a position at which the stereo camera 6 is fixed.

The automotive camera mounting apparatus 10 includes a taper plate 11 as a support plate. The taper plate 11 is disposed in an inclined state along the windshield 3 and has a first end portion fixed to the front rail 2 positioned on a periphery of the windshield. Specifically, the taper plate 11 is formed of a metal plate extending in the longitudinal direction of the vehicle body. The first end portion at the rear of the taper plate 11 assumes a first fixing portion 12 fixed to the front rail 2, while a second end portion at the front of the taper plate 11 assumes a second fixing portion 13 fixed to the windshield 3. A middle portion of the taper plate 3 assumes a third fixing portion 14 to which the stereo camera 6 is fixed. The second fixing portion 13 is fixed to the mirror base 4 as a bearing member fixed to the windshield 2.

The taper plate 11 is configured so as to be bent downwardly from the first fixing portion 12 in the rear, so that when the taper plate 11 is fixed to the front rail 2 using the first fixing portion 12, the second fixing portion 13 at the front and the third fixing portion 14 extend in parallel with the windshield 3. In addition, the taper plate 11 is formed so as to taper gradually toward the front with the first fixing portion 12 fixed to the front rail 2 being formed into a wide parallel portion. The taper plate 11 is supported at its both ends fixed in place. As compared with a cantilevered member, the taper plate 11 requires less strength and achieves reduction in weight with a simple configuration. Furthermore, the taper plate 11 may even be formed of a resin, in addition to metal.

As shown in FIGS. 2(a) and 2(b), the taper plate 11 includes locator pins 15 and has threaded holes 16 formed therein. The locator pins 15 are disposed at the first fixing portion 12 and accurately position the taper plate 11 relative to the front rail 2. The threaded holes 16 are formed also in the first fixing portion 12 to fix the taper plate 11 to the front rail 2. In addition, the second fixing portion 13 on the leading end side has threaded holes 17 formed therein to fix fixing points of, for example, the mirror base 4 disposed on the windshield 3 to the front side of the taper plate 11. The third fixing portion 14 has threaded holes 18 formed therein to fix the taper plate 11 to the stereo camera 6.

To allow the stereo camera 6 to correctly recognize the position of, for example, a vehicle, a pedestrian, a traffic light, and a road sign present in the vehicle traveling direction, preferably, the stereo camera 6 is mounted on the vehicle such that an axis in parallel with the vehicle traveling direction (hereinafter referred to as a vehicle axis) and an imaging direction of the stereo camera 6 extend in parallel with each other or are angled by a target angle relative to each other. The direction in which the vehicle axis extends is determined by holes formed in the front rail 2. The imaging direction of the stereo camera 6 can be accurately fixed in a desired direction by the locator pins 15 included in the taper plate 11 fitting into the holes formed in the front rail 2.

While FIG. 2(a) shows that the locator pins 15 are formed on the side of the taper plate 11, the front rail may include locator pins and the taper plate 11 may have holes for receiving the locator pins. The second fixing portion 13 to be fixed to the windshield 3 may include locator pins and the mirror base 4 affixed to the windshield 3 may have holes in which the locator pins are fitted.

Additionally, to fix the stereo camera 6 oriented toward a desired imaging direction to the taper plate 11 as described above, the stereo camera 6 and the taper plate 11 need to be accurately positioned relative to each other. To achieve that end, the third fixing portion 14 between the taper plate 11 and the stereo camera 6 may include, for example, locator pins 19 that made on the taper plate 11 which protrudes downwardly, in addition to the threaded holes 18 for fixing, and the fixing portion 8 of the stay 7 on the side of the stereo camera 6 may have holes into which the locator pins are fitted. In contrast, the fixing portion 8 of the stay 7 may include locator pins protruding therefrom and the taper plate 11 may have holes into which the locator pins are fitted.

As a method for fixing the taper plate 11 oriented toward a desired direction to the front rail 2, the taper plate 11 may have a groove portion 20 extending in the longitudinal direction as shown in FIGS. 2(a) and 2(b). Then, the front rail 2 may have a protrusion having a shape identical to that of the groove portion 20 as shown in FIGS. 2(a) and 2(b) and the protrusion is fitted into the groove portion to thereby achieve an accurate mounting position. Additionally, as a method for fixing the stereo camera 6 and the taper plate 11 together in a desired direction, the abovementioned groove portion and protrusion may be used. The taper plate 11 can have enhanced strength by having the groove portion 20 in the center thereof extending in the longitudinal direction.

Many late vehicle models have inside rearview mirrors including illuminance sensors that measure forward and rearward illuminance. These sensors require wiring for a power source. Wires for supplying power to sensors and other devices disposed in the inside rearview mirror 5 may be housed in the groove portion 20 in the taper plate 11 and routed onto the side of the front rail 2. This facilitates routing of the wires, eliminating the need for a wire cover and related parts.

Figure 3:
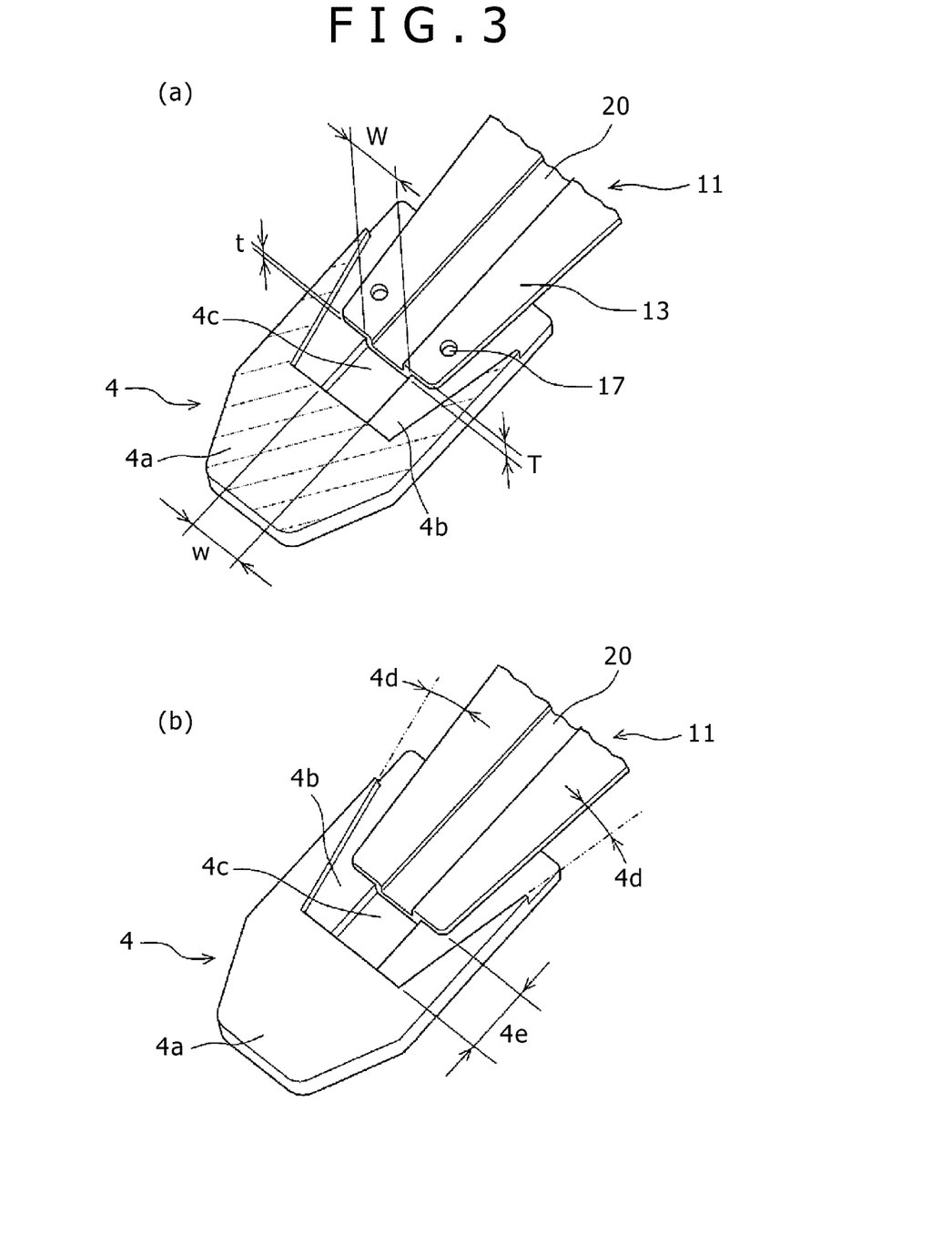
FIGS. 3(a) and 3(b) are perspective views, each showing a shape of a leading end of the taper plate and a main section of a mounting portion to be mounted on the side of a mirror base.

Fixing of the taper plate 11 at its leading end side (vehicle forward side) will be described below with reference to FIGS. 3(a) and 3(b). FIGS. 3(a) and 3(b) show the fixing portion 13 of the taper plate 11 on the side of the windshield 3. To fix the forward side end portion of the taper plate 11 to the windshield 3, the windshield 3 may have a base to which the end portion is to be fixed. The base may be integrated with the mirror base 4 and, in the embodiment, the second end portion (front end portion) of the taper plate 11 is fixed to the mirror base 4. If the second end portion of the taper plate 11 is separate from the mirror base 4, the mirror base 4 may cover the fixing end to enhance a design effect. Then, the stereo camera 6 is fixed to the taper plate 11 having the front end portion fixed in place and the stereo camera 6 images the vehicle traveling direction. The stereo camera 6 may be fixed in an orientation in which the vehicle interior is imaged.

In the embodiment, the mirror base 4 is fixed to the windshield 3 by bonding. The mirror base 4 has an upper surface (a surface in contact with the windshield 3) 4a (indicated by dash-double-dot, parallel diagonal lines). The upper surface 4a has a shoulder portion 4b formed therein in which the leading end portion (second end portion) of the taper plate 11 is inserted. The taper plate 11 has the groove portion 20 extending in the longitudinal direction. The shoulder portion 4b has a deep portion 4c formed at a center thereof. The groove portion 20 is inserted into the deep portion 4c. The shoulder portion 4b has a depth that corresponds to a thickness t of the taper plate 11. The deep portion 4c has a depth that corresponds to a thickness T of the groove portion 20. The groove portion 20 has a width W that is formed to be equal to a width w of the deep portion 4c. With the mirror base 4 affixed to the windshield 3, openings of the shoulder portion 4b and the deep portion 4c are formed between a lower surface (an interior side surface) of the windshield 3 and an upper surface of the mirror base 4. The leading end of the taper plate 11 can then be inserted into these openings.

The mirror base 4 and the taper plate 11 may be fixed to each other by screw fastening or, as shown in FIGS. 3(a) and 3(b), the leading end of the taper plate 11 may be inserted between the mirror base 4 and the windshield 3. Alternatively, the inserting and the screw fastening may be combined with each other; specifically, with the leading end of the taper plate 11 inserted into the shoulder portion 4b and the deep portion 4c in the mirror base 4, screws are threaded into the threaded holes 17 at the leading end of the taper plate 11 to thereby achieve the screw fastening.

In the first embodiment, vertical fluctuations of the stereo camera 6 due to vertical vibrations in the taper plate 11 mounted in the vehicle need to be prevented most. Thus, as shown in FIGS. 3(a) and 3(b), the taper plate 11 is inserted between the mirror base 4 and the windshield 3 and fixed in place using the threaded holes 17 formed therein. As shown in FIG. 3(b), the taper plate 11 may be fixed in place by simply inserting the leading end.

Even if the leading end of the taper plate 11 is not inserted between the windshield 3 and the mirror base 4, the mirror base 4 may have a hole formed therein and the leading end of the taper plate 11 may be inserted into the hole. If the mirror base 4 is used in combination to fix the leading end side of the taper plate 11, the mirror base 4 is affixed to the windshield 3 which, in turn, is mounted on the vehicle body. This is likely to result in poor positional accuracy in the mirror base 4 relative to the front rail 2. To compensate for the positional deviation in this case, at least one receiving hole in the plate is formed into a slot. Alternatively, with the shape as shown in FIG. 3(b), spaces 4d, 4e as allowances for the positional deviation may be provided to accommodate any deviation without changing the direction of the taper plate 11.

Forming the groove portion 20 in the taper plate 11 and fitting the groove portion 20 into the deep portion 4c of the shoulder portion 4b in the mirror base 4 is suitable for positioning the mirror base 4 and the taper plate 11 in the lateral direction (vehicle width direction). This provides two fixing points at front and rear for the taper plate 11. Compared with a cantilevered single point fixing, the plate can have less strength. Thus, the taper plate 11 may be formed of metal or resin. Use of a resin to make the plate achieves reduction in weight of the plate and is more advantageous in terms of vibration resistance.

Figure 4:
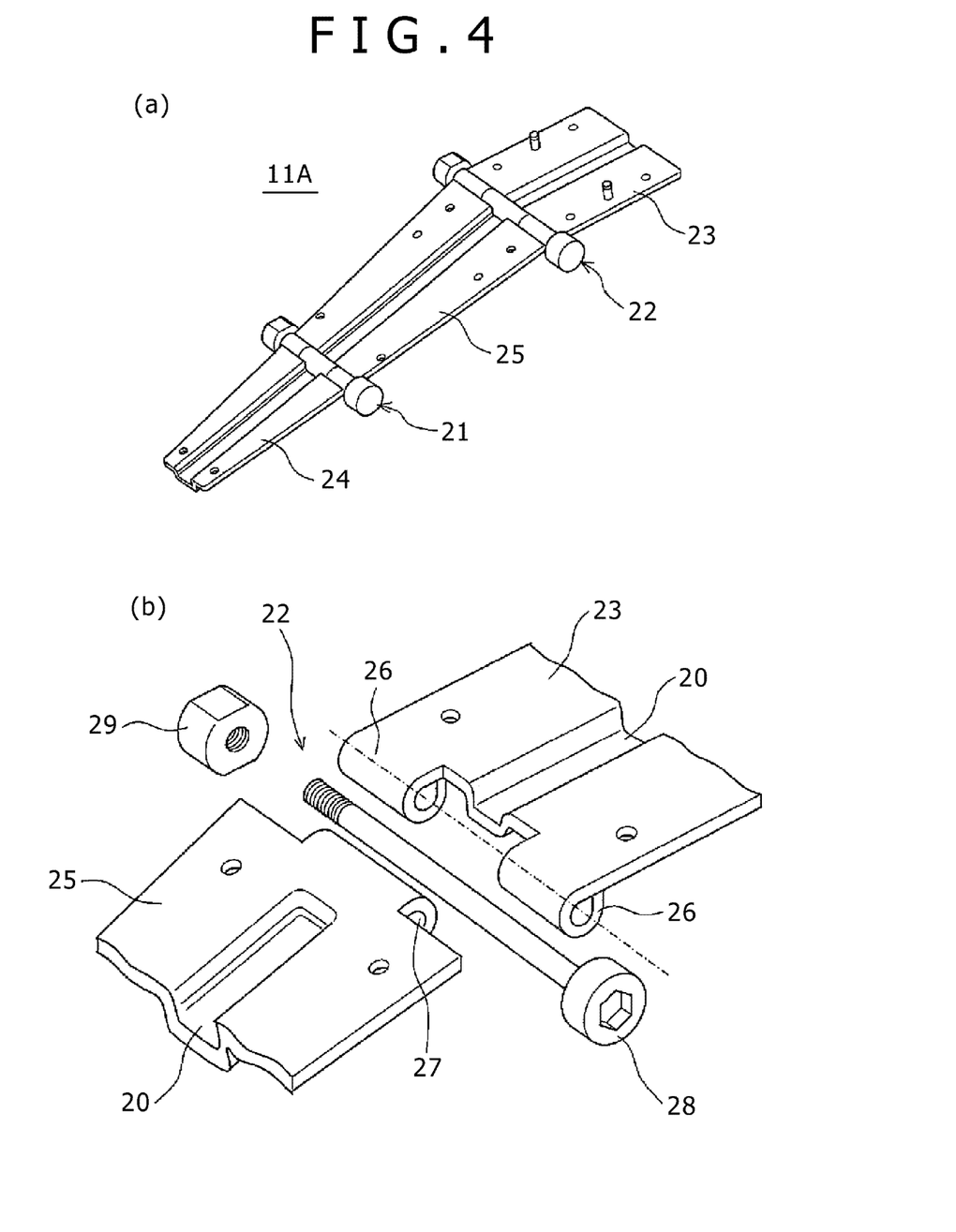
FIG. 4(a) is a perspective view showing a taper plate according to a modification.
FIG. 4(b) is an exploded perspective view showing a main section of an angle adjusting portion of the taper plate shown in FIG. 4(a).

A taper according to a modification will be described below with reference to FIGS. 4(a) and 4(b). A taper plate 11A shown in FIGS. 4(a) and 4(b) includes angle adjusting mechanisms 21, 22 disposed at two places midway an overall length in the longitudinal direction thereof. FIG. 4(a) shows the angle adjusting mechanisms only schematically. The angle adjusting mechanism 22 is disposed between a first fixing portion 23 on the side of the front rail 2 and a middle third fixing portion 25 to which the stereo camera 6 is fixed. The angle adjusting mechanism 21 is disposed between the middle third fixing portion 25 and a second fixing portion 24 on the leading end side. The angle adjusting mechanisms have a configuration similar to that of a hinge mechanism and are capable of changing angles of the three fixing portions.

The angle of the windshield varies from one vehicle model to another and, accordingly, the angle of the bent portion in the taper plate needs to be changed. In late passenger vehicle models, in particular, the angle of the windshield is made shallow with the aim of improved fuel economy, the angle being nearly 20 degrees. In contrast, in sport utility vehicles (SUVs) having a high vehicle height and compact vehicles, the angle of the windshield is steep, close to 45 degrees. The angle adjusting mechanisms 21, 22 are used to respond to all possible types of vehicles having different windshield angles.

On one hand, only the angle adjusting mechanism 21 on the side of the windshield 3 can satisfy the need for angle adjustments. To efficiently dispose the stereo camera 6 between the windshield 3 and front rail 2, on the other, preferably the angle adjusting mechanism 22 is available also on the side of the front rail 2. The use of the two angle adjusting mechanisms 21, 22 accommodates different angles and curved states of the windshield, thereby enabling the stereo camera 6 to be mounted in a steady position.

The taper plate 11A including the two angle adjusting mechanisms basically includes three members. Specifically, the taper plate 11A includes a leading end member 24, an intermediate member 25, and a rear member 23. The leading end member 24 is disposed at the front and constitutes the second fixing portion. The intermediate member 25 is disposed in the middle and constitutes the third fixing portion. The rear member 23 is disposed in the rear and constitutes the first fixing portion. The angle adjusting mechanisms 21, 22 each have a configuration substantially identical to each other and the rear angle adjusting mechanism 22 only will be described in detail. The angle adjusting mechanism 22 swingably connects the intermediate member 25 and the rear member 23. The angle adjusting mechanism 22 connects two bearing portions 26, 26 formed at a front end portion of the rear member 23 and one bearing portion 27 formed at a rear end portion of the intermediate member 25 through a coupling shaft 28.

A lock nut 29 threadedly engages a leading end of the coupling shaft 28, so that tightening the lock nut 29 allows the bearing portions 26, 26 of the rear member 23 and the bearing portion 27 of the intermediate member 25 to be fixed in place at any desired angle. The foregoing arrangements allow the taper plate 11A to be fixed in a steady state between the front rail 2 and the windshield 3 by adjusting the angle adjusting mechanisms 21, 22 even when the angle of the windshield 3 of the vehicle is shallow or steep, so that the automotive camera 6 can be steadily mounted.

<Second Embodiment>

Figure 5:
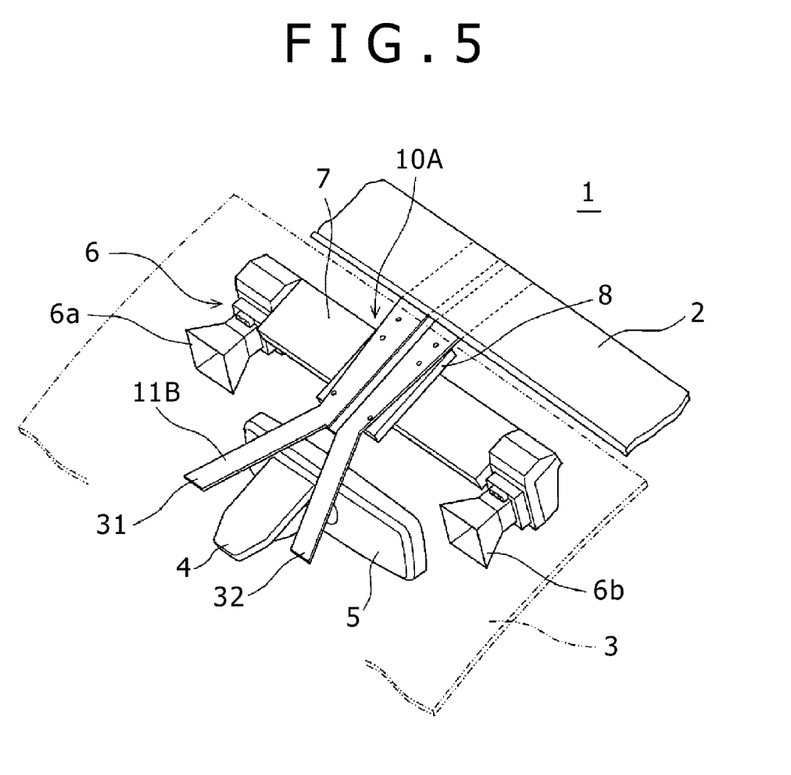
FIG. 5 is a perspective view showing an automotive camera mounting apparatus according to a second embodiment of the present invention as viewed from a forward direction outside the vehicle.

An automotive camera mounting apparatus 10A according to a second embodiment includes a taper plate having a shape different from that of the taper plate in the first embodiment, as shown in FIG. 5. Like or corresponding parts are identified by the same reference numerals as in the first embodiment and descriptions for those parts will not be duplicated. A taper plate 11B in the second embodiment has a bifurcate end portion on the vehicle forward side, the bifurcate end portion forming two fixing portions 31, 32. While the Fig. shows that the two fixing portions 31, 32 are directly fixed to the windshield 3 by, for example, bonding, two bases (not shown) may be fixed to the windshield and the fixing portions 31, 32 may be fixed to the fixed base through, for example, screw fastening.

In the taper plate 11B according to the second embodiment, a gap between fixing points on the side of the windshield 3 is widened. This allows the fixing state of the taper plate to be even steadier, so that the stereo camera 6 can be even more steadily fixed in place. Additionally, in the arrangement in which the fixing points are different from that of a column of the inside rearview mirror 5 or the mirror base 4, the taper plate 11B can be disposed so as to circumvent the mirror base 4. Furthermore, widening the gap between the fixing points allows displacement relative to a lateral force applied to the leading end side of the taper plate 11B to be reduced.

<Third Embodiment>

Figure 6:
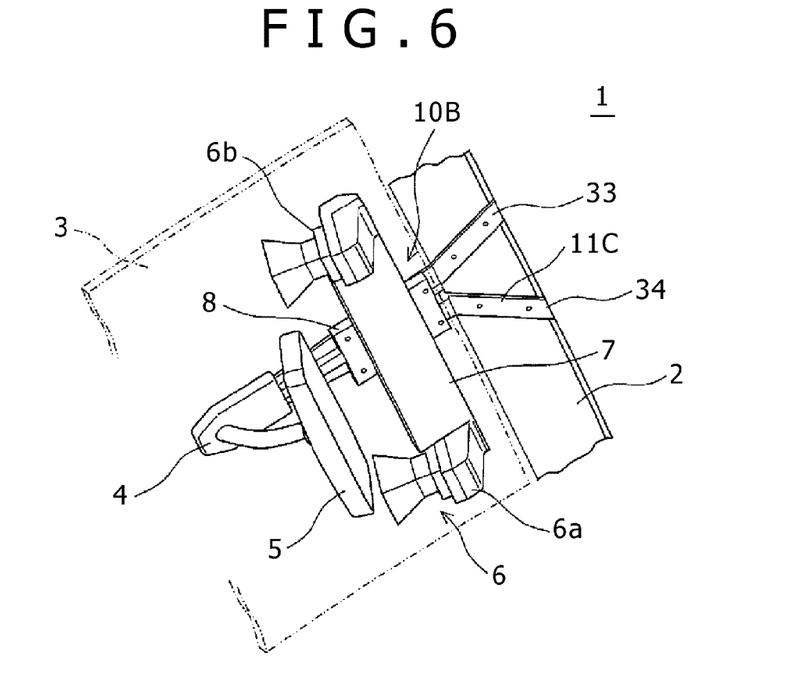
FIG. 6 is a perspective view showing an automotive camera mounting apparatus according to a third embodiment of the present invention as viewed from a downward direction inside the vehicle.

As shown in FIG. 6, an automotive camera mounting apparatus 10B according to a third embodiment includes a taper plate 11C that includes a first fixing portion on the rear side of the vehicle shaped differently from those in the first and second embodiments. The first fixing portion of the taper plate 11C on the side adjacent to the front rail 2 is bifurcated to form two fixing portions 33, 34.

The taper plate 11C in the third embodiment has a gap between fixing points on the side adjacent to the front rail 2 widened, so that the taper plate can be fixed in place even more steadily. The stereo camera 6 can thereby be even more steadily fixed in place. Additionally, the taper plate 11C can be disposed so as to circumvent a lamp or a sun glass holder disposed on the side of the front rail 2. Furthermore, widening the gap between the fixing points allows displacement relative to a lateral force applied to the trailing end side of the taper plate 11C to be reduced.

<Fourth Embodiment>

Figure 7:
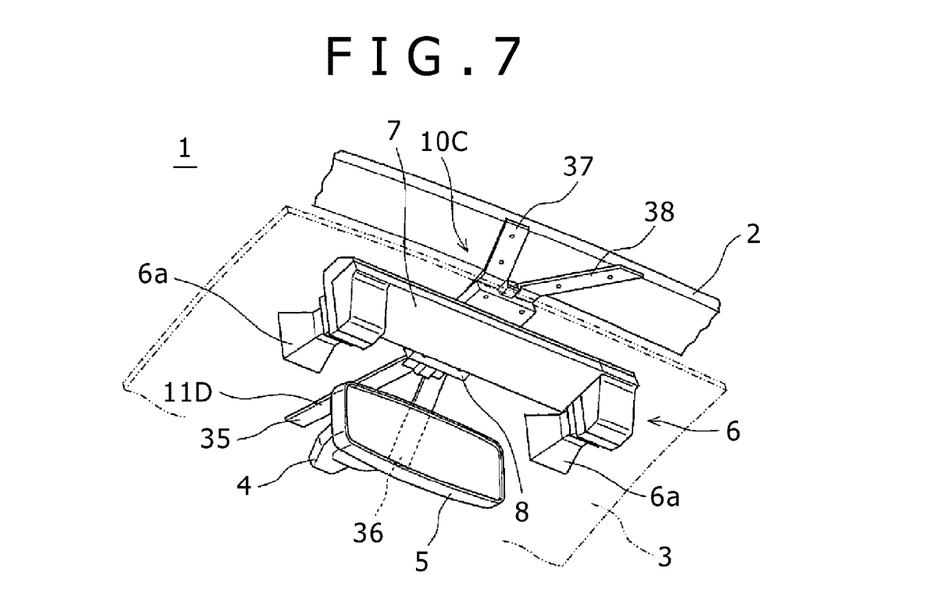
FIG. 7 is a perspective view showing an automotive camera mounting apparatus according to a fourth embodiment of the present invention as viewed from the rearward direction inside the vehicle.

An automotive camera mounting apparatus 10C according to a fourth embodiment includes a taper plate having a shape different from those of the taper plates in other embodiments, as shown in FIG. 7. Like or corresponding parts are identified by the same reference numerals as in the first embodiment and descriptions for those parts will not be duplicated. A taper plate 11D in the fourth embodiment has a bifurcate end portion on the vehicle forward side, the bifurcate end portion forming two fixing portions 35, 36. In addition, the taper plate 11D in the fourth embodiment includes a bifurcate first fixing portion on the side adjacent to the front rail 2, the bifurcate first fixing portion forming two fixing portions 37, 38. While the Fig. shows that the two fixing portions 35, 36 are directly fixed to the windshield 3 by, for example, bonding, two bases (not shown) may be fixed to the windshield and the fixing portions 35, 36 may be fixed to the fixed base through, for example, screw fastening.

The taper plate 11D in the fourth embodiment has the front and rear end portions bifurcated, the front end portion being fixed in place at two points and the rear end portion being fixed in place also at two points. This allows the fixing state of the taper plate to be even steadier, so that the stereo camera 6 can be even more steadily fixed in place. Specifically, widening the gap between the fixing points allows displacement relative to an applied lateral force to be reduced. In the embodiments shown in FIGS. 5 and 6, when a lateral force is applied to the taper plate, the stereo camera 6 is displaced so as to be twisted because of a poor longitudinal balance involved. By widening the gap between the two fixing points on both the front rail 2 side and the windshield 3 side, therefore, the arrangement minimizes a lateral displacement of the stereo camera 6 and prevents torsion from occurring easily even when the displacement occurs.

<Fifth Embodiment>

Figure 8:
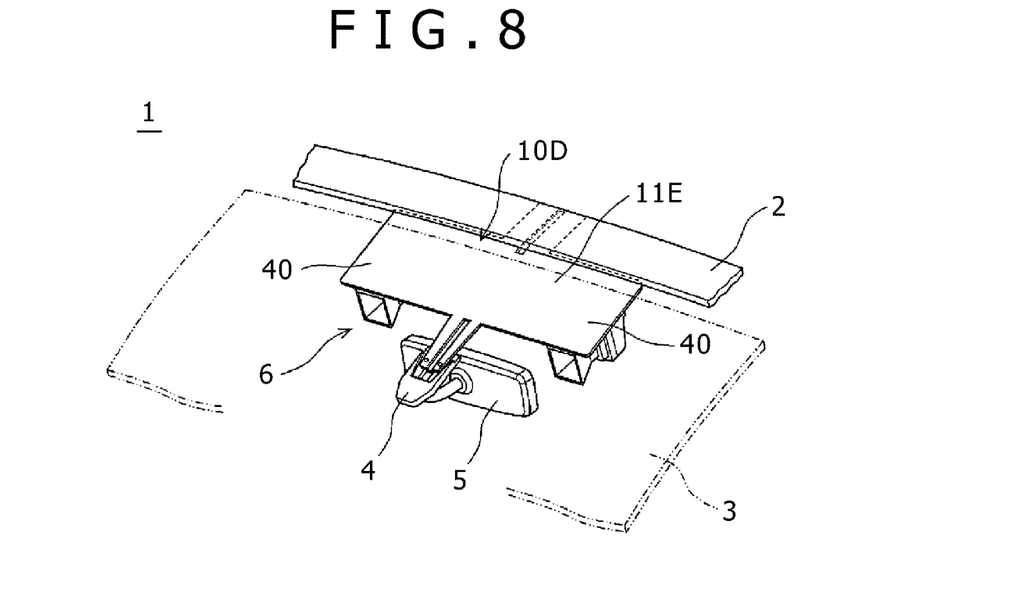
FIG. 8 is a perspective view showing an automotive camera mounting apparatus according to a fifth embodiment of the present invention as viewed from a forward direction outside the vehicle.
Figure 9:
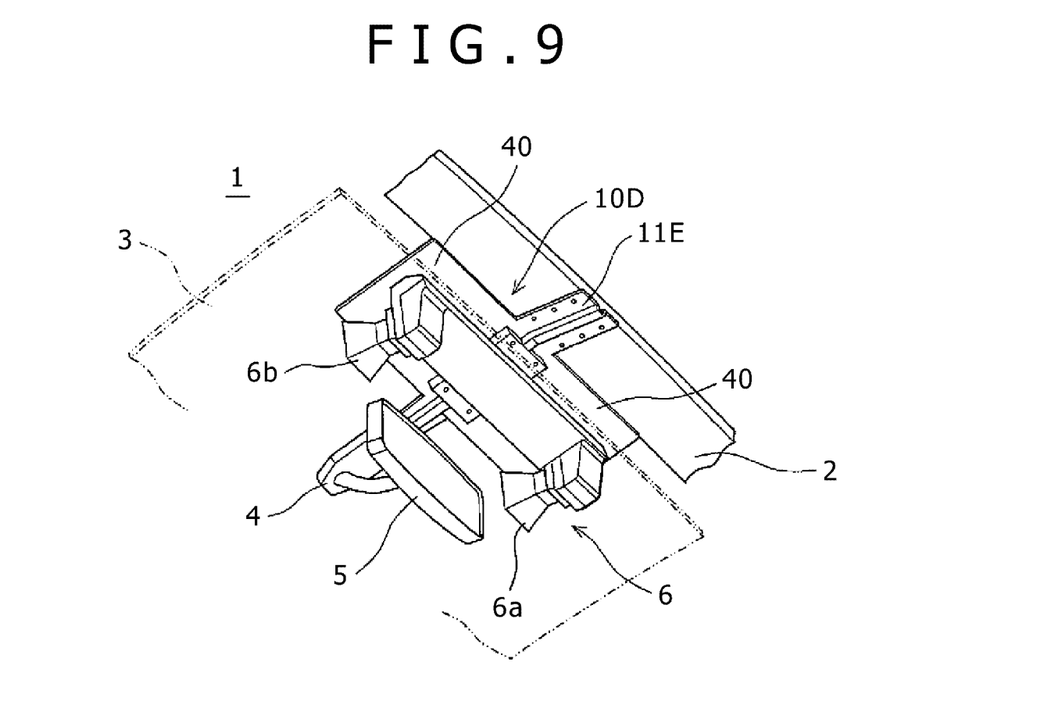
FIG. 9 is a perspective view showing the automotive camera mounting apparatus shown in FIG. 8 as viewed from a downward direction inside the vehicle.

An automotive camera mounting apparatus according to a fifth embodiment will be described below with reference to FIGS. 8 and 9. The fifth embodiment is characterized in that a taper plate has a shape to which a design effect is added. As shown in FIGS. 8 and 9, when an automotive camera mounting apparatus 10D and the stereo camera 6 are viewed over the windshield 3 from the outside of the vehicle interior, a taper plate 11E includes shielding portions 40, 40 that shield an upper portion of the stereo camera such that part or all of the housing other than the range of angle of view of the stereo camera 6 is hidden. The taper plate 11E in this embodiment includes the shielding portions 40, 40 that are shaped into a rectangle extending in the vehicle width direction from a central portion or a third fixing portion on which the stereo camera 6 is mounted.

Figure 1:
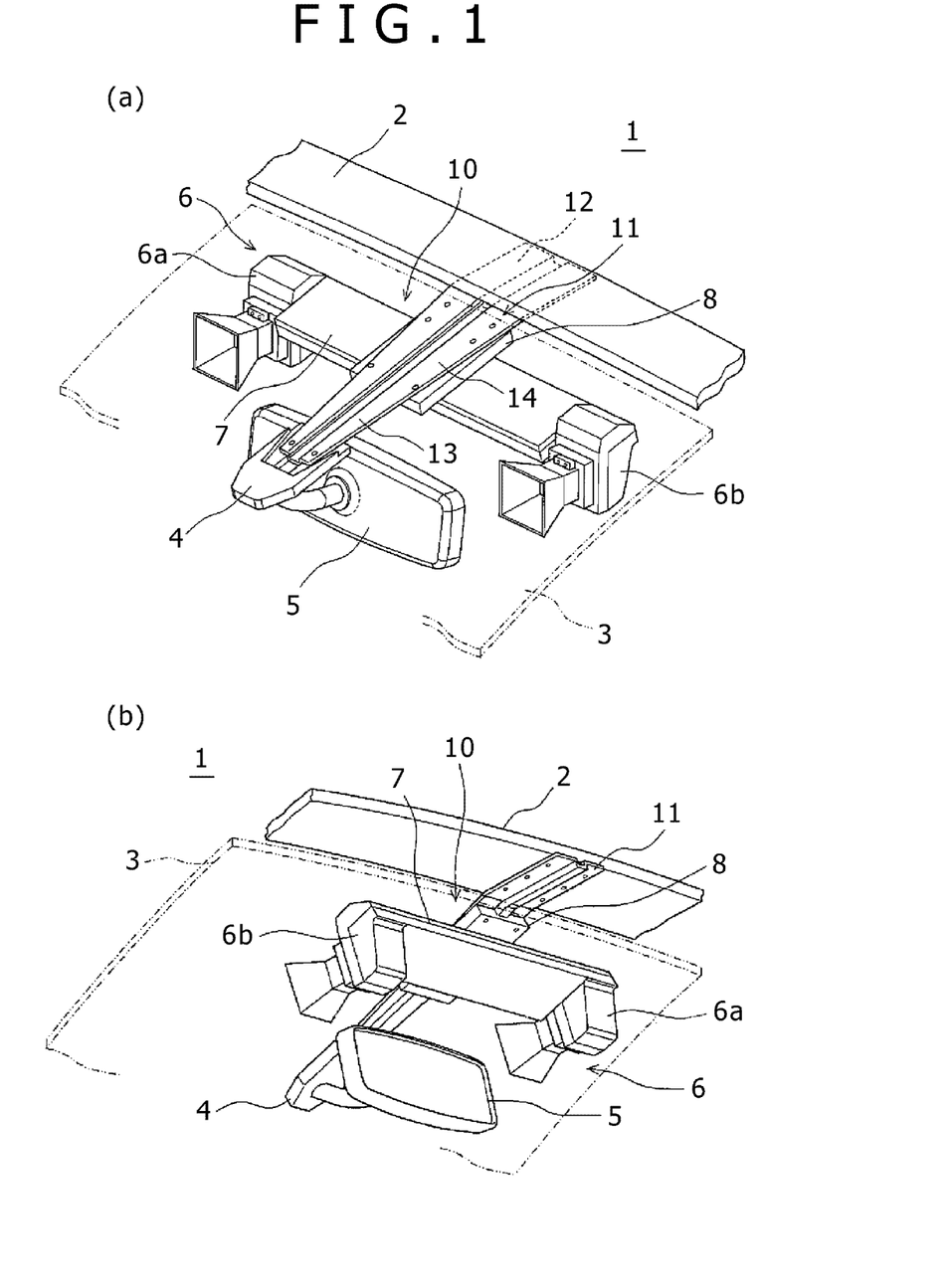
FIG. 1(a) is a perspective view showing an automotive camera mounting apparatus according to a first embodiment of the present invention as viewed from a forward direction outside a vehicle.
FIG. 1(b) is a perspective view of the apparatus shown in FIG. 1(a) as viewed from a rearward direction inside the vehicle.
Figure 2:
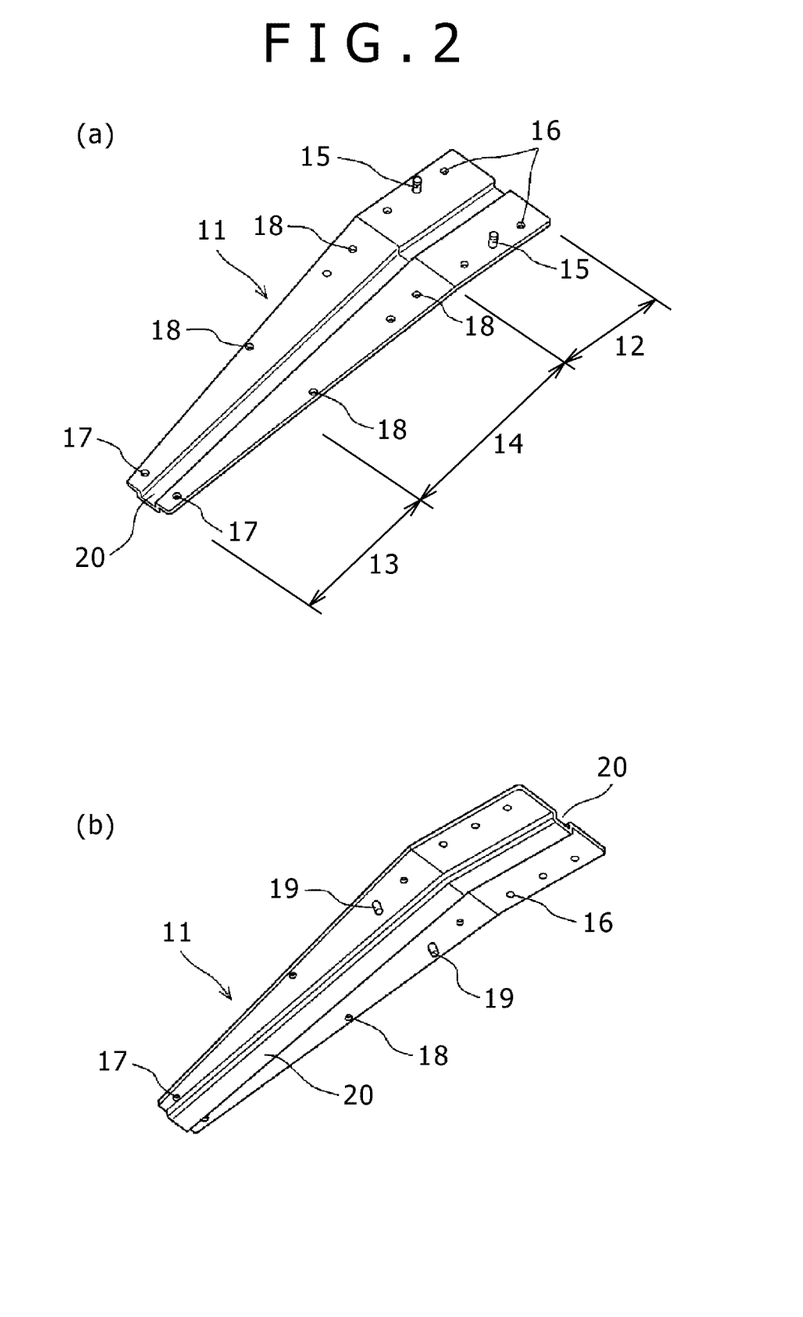
FIG. 2(a) is a perspective view showing a taper plate as a support plate incorporated in the apparatus according to the first embodiment shown in FIG. 1(a)
FIG. 2(b) is a perspective view showing the taper plate as viewed from a downward direction.

In FIG. 1, the taper plate 11 is disposed at a central portion above the stereo camera 6. When the stereo camera 6 is viewed from the outside of the vehicle interior, however, most of the housing shape is visible. The windshield 3 generally has a shielding area so as to make the stereo camera 6 invisible from the outside of the vehicle interior. In FIGS. 8 and 9, however, the shielding portions 40, 40 of the taper plate 11E can hide the housing of the stereo camera 6 even without the windshield 3 having a shielding area.

Generally, the shielding area of the windshield in a vehicle on which an automotive camera is mounted needs to be disposed so as to circumvent the angle of view of the automotive camera. This necessitates the use of a type of windshield different from that mounted in the vehicle on which the automotive camera is not to be mounted. It is thus necessary to provide only one type of shielding area for the windshield per vehicle model.

The taper plate 11E shown in FIGS. 8 and 9 is preferably colored in black to serve also as the shielding area. Additionally, because of the taper plate 11E being widened laterally, resin may be employed to achieve reduction in weight. Furthermore, the shape of the taper plate 11E prevents the stereo camera 6 from being exposed to direct sunlight, which yields an effect of preventing the temperature of the housing of the stereo camera 6 from rising.

Figure 10:
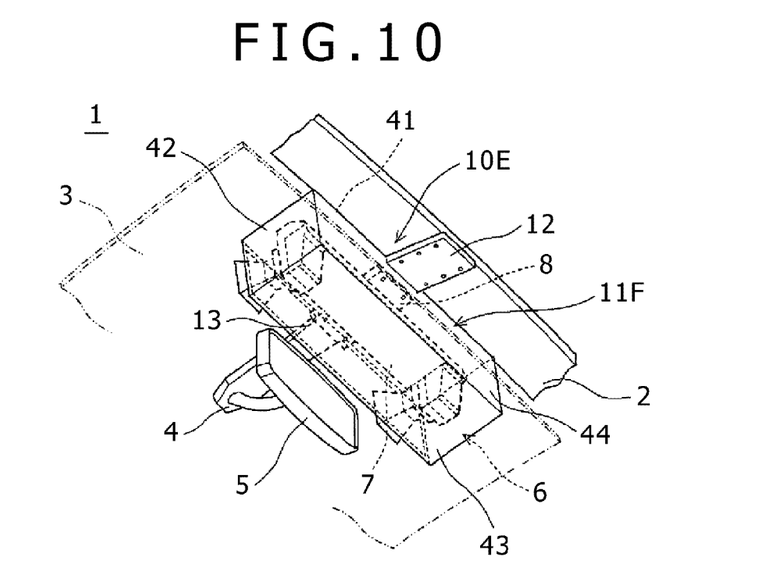
FIG. 10 is a perspective view showing the taper plate shown in FIG. 9 according to a modification as viewed from a downward direction inside the vehicle.

As in a modification of the fifth embodiment shown in FIG. 10, the taper plate may be disposed on a lower side and side surfaces of the stereo camera 6 so as to shield the stereo camera 6 other than the range of angle of view of the stereo camera 6. Thus, whereas the conventional structure requires two parts of the plate for fixing the stereo camera 6 and the design cover for shielding the camera, the modification requires only one part of the taper plate.

A taper plate 11F shown in FIG. 10 includes a cover portion disposed below the stereo camera 6. The taper plate 11F is shaped into a box that opens forwardly. The taper plate 11F includes an upper plate portion 41 as a shielding portion, side plate portions 42, 42, a lower plate portion 43 as the cover portion, and a rear plate portion 44. The stereo camera 6 is mounted inside the box-shaped taper plate 11F and capable of imaging an area in the vehicle traveling direction through the front opening.

The taper plate 11F has a first fixing portion 12 fixed to the front rail 2, the first fixing portion 12 protruding from the rear of the box, and a second fixing portion 13 fixed to the mirror base 4 fixed to the windshield 3, the second fixing portion 13 protruding forwardly. The fixing portion 8 of the stay 7 for the stereo camera 6 is then fixed to the upper plate portion 41 in the middle of the taper plate 11F. This results in the camera 6 being fixedly disposed in the box-shape taper plate. In the modification of the fifth embodiment, the stereo camera 6, while being capable of avoiding direct sunlight, is covered to enhance appearance in the vehicle interior.

<Sixth Embodiment>

An automotive camera mounting apparatus according to a sixth embodiment will be described below with reference to FIG. 11. An automotive camera mounting apparatus 10F according to the sixth embodiment is characterized by comprising a taper plate 11G shaped to have vent ports 45 and a vent path 46. As described earlier, disposing the stereo camera 6 at an optimum position can aggravate the condition of temperature increase by direct sunlight, compared with the arrangement in which the stereo camera 6 is mounted on the front rail 2. Specifically, the stereo camera 6, being fixed at a position below the windshield and ahead of the front rail 2, is subject to direct sunlight.

Even if the sunlight does not directly fall on the stereo camera 6, the vehicle is subject to the direct sunlight, so that the temperature of the front rail 2 increases and the temperature of the stereo camera 6 eventually increases via the taper plate.

Figure 11:
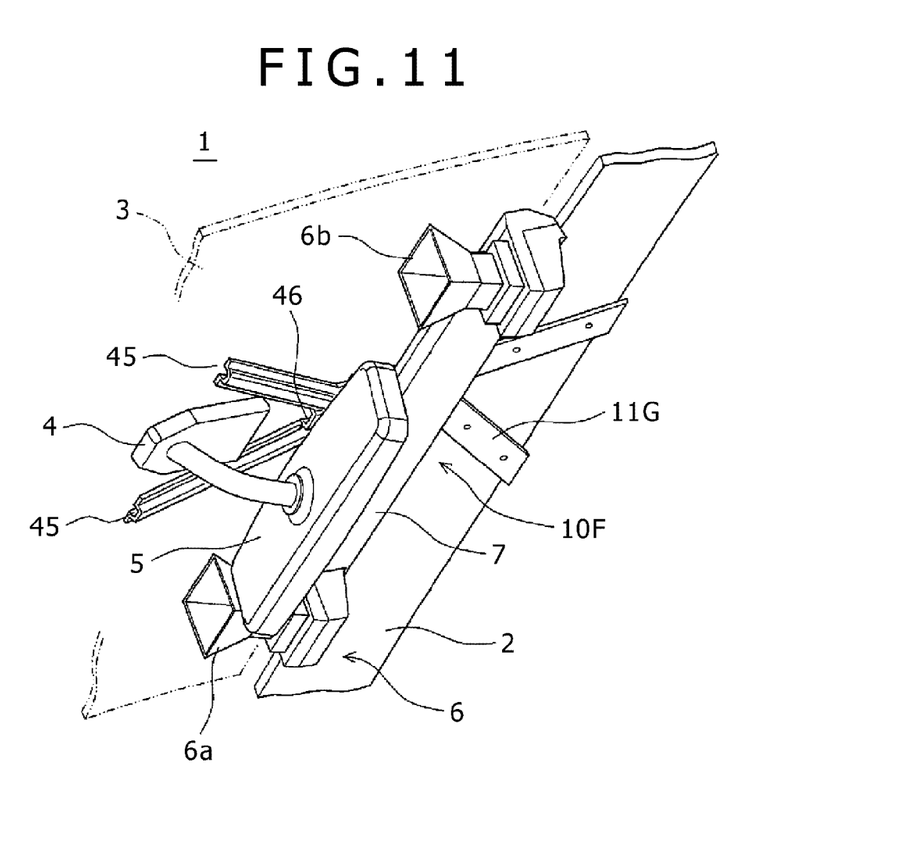
FIG. 11 is a perspective view showing an automotive camera mounting apparatus according to a sixth embodiment of the present invention as viewed from a forward and downward direction inside the vehicle.

Thus, as shown in FIG. 11, the taper plate 11G has the vent ports 45 and the vent path 46. Generally, cooling air that falls on the stereo camera 6 flows from a downward direction along the windshield 3. Then, the cooling air drawn in through the vent ports 45 can travel along the vent path 46 to decrease the high temperature of the entire taper plate 11G. The more the number of vent ports 45 and vent paths 46, the greater the cooling effect. Additionally, a greater amount of cooling air can be drawn in with larger vent ports 45.

The cooling air may be directed to the stereo camera 6 from any direction other than the downward one. If, for example, the cooling air blows from the rear, the vent ports 45 can be oriented toward the rear side against which the cooling air blows. Disposing the vent ports 45 and the vent paths 46 as appropriate allows the cooling air to flow along the taper plate 11G, thereby preventing the temperature of the taper plate from increasing, which contributes to more steady operations of the stereo camera 6.

It should be noted that the present invention is not limited to the above-described embodiments and may include various modifications. For example, the entire detailed arrangement of the embodiment described above for ease of understanding of the present invention is not always necessary to embody the present invention. For example, in some embodiments described above, the taper plate is exemplified to include the bifurcated first and second fixing portions. Understandably, the taper plate may be trifurcated or a separation into four or more branches.

Additionally, part of the arrangement of one embodiment may be replaced with the arrangement of another embodiment, or the arrangement of one embodiment may be combined with the arrangement of another embodiment.

Furthermore, the arrangement of each embodiment may additionally include another arrangement, or part of the arrangement may be deleted or replaced with another.

DESCRIPTION OF REFERENCE NUMERALS

1: vehicle
2: front rail
3: windshield
4: mirror base (bearing member)
4d, 4e: space (bearing portion)
5: inside rearview mirror
6: stereo camera (automotive camera)
7: stay
8: fixing portion of stay
10, 10A, 10B, 10C, 10D, 10E, 10F: automotive camera mounting apparatus
11, 11A, 11B, 11C, 11D, 11E, 11F, 11G: taper plate (support plate)
12, 23: first fixing portion
13, 24: second fixing portion
14, 25: third fixing portion
16: front rail fixing threaded hole
15: front rail side positioning locator pin
17: windshield side fixing threaded hole
18: stereo camera fixing threaded hole
19: stereo camera positioning locator pin
20: groove portion
21: front rail side angle adjusting mechanism
22: windshield side angle adjusting mechanism
31, 32, 37, 38: bifurcate first fixing portion
33, 34, 35, 36: bifurcate second fixing portion
40: shielding portion
43: cover portion
45: vent port
46: vent path

The invention claimed is:

1. An automotive camera mounting apparatus for mounting on an inside of a windshield of a vehicle an automotive camera that images a forward view of the vehicle through the windshield, the automotive camera mounting apparatus comprising:

a support plate disposed along the windshield, wherein
the support plate has a first end portion fixed to a front rail disposed on a periphery of the windshield, a second end portion fixed to the windshield, and an intermediate fixing portion holding the automotive camera,
the intermediate fixing portion is formed at an intermediate portion of the support plate,
the automotive camera is a stereo camera comprising a stay and two camera portions disposed on respective lateral end portions of the stay, and
an intermediate portion of the stay of the automotive camera is fixedly disposed on the intermediate fixing portion.

2. The automotive camera mounting apparatus according to claim 1, wherein the automotive camera is supported by the stay fixed to the fixing portion of the support plate.

3. The automotive camera mounting apparatus according to claim 1, wherein
the stay is formed into a long taper shape extending in a direction perpendicular to a longitudinal direction of the support plate.

4. The automotive camera mounting apparatus according to claim 1, wherein the second end portion of the support plate is fixed via a bearing member fixed to the windshield.

5. The automotive camera mounting apparatus according to claim 4, wherein the bearing member has a bearing portion that accommodates any mounting error in the support plate.

6. The automotive camera mounting apparatus according to claim 1, wherein the support plate has a groove portion formed therein, the groove portion extending in the longitudinal direction of the support plate.

7. The automotive camera mounting apparatus according to claim 1, wherein the second end portion of the support plate is fixed to a fixing portion of an inside rearview mirror of the vehicle.

8. The automotive camera mounting apparatus according to claim 1, wherein the first end portion of the support plate is bifurcated or trifurcated, or separated into four or more branches, and fixed to the front rail.

9. The automotive camera mounting apparatus according to claim 1, wherein the second end portion of the support plate is bifurcated or trifurcated, or separated into four or more branches, and fixed to the windshield.

10. The automotive camera mounting apparatus according to claim 1, wherein the support plate includes a shielding portion that covers an upper portion of the automotive camera.

11. The automotive camera mounting apparatus according to claim 1, wherein the support plate includes a cover portion that covers a lower portion of the automotive camera.

12. The automotive camera mounting apparatus according to claim 1, wherein the support plate has a vent port and a vent path.

* * * * *